(12) United States Patent
McKay et al.

(10) Patent No.: US 6,367,462 B1
(45) Date of Patent: Apr. 9, 2002

(54) ENGINE TORQUE MANAGEMENT METHOD WITH HIGH DILUTION EGR CONTROL

(75) Inventors: Daniel Lee McKay, Brighton; Gary Arthur Nichols, Farmington Hills; Martin Müller, Ann Arbor, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/661,229

(22) Filed: Sep. 13, 2000

(51) Int. Cl.$^7$ .......................... F02B 47/08; F02M 25/07
(52) U.S. Cl. ................... 123/568.21; 123/399; 701/108
(58) Field of Search ..................... 123/568.21, 406.23, 123/406.24, 406.25, 406.44, 406.45, 406.46, 406.48, 399, 295, 361; 701/108, 110

(56) References Cited

U.S. PATENT DOCUMENTS

| | | | | |
|---|---|---|---|---|
| 5,623,906 A | * | 4/1997 | Storhok | 123/419 |
| 5,755,198 A | * | 5/1998 | Grob et al. | 123/295 |
| 6,024,069 A | * | 2/2000 | Yoshino | 123/295 |
| 6,267,095 B1 | * | 7/2001 | Ikeda et al. | 123/295 |
| 6,298,835 B1 | * | 10/2001 | Horie et al. | 123/568.21 |
| 6,311,679 B1 | * | 11/2001 | Druzhinina et al. | 123/568.21 |

* cited by examiner

Primary Examiner—Tony M. Argenbright
Assistant Examiner—Hai Huynh
(74) Attorney, Agent, or Firm—Vincent A. Cichosz (57) ABSTRACT

An improved engine torque management control that coordinates engine throttle, spark and EGR under predefined highly throttled conditions so as to maximize the fuel economy improvement of EGR without degrading engine performance. Under the predefined conditions, EGR is increased to a level that maximizes the fuel economy improvement without causing combustion instability, and the throttle position and spark timing are controlled to compensate for the anticipated torque loss while increasing volumetric efficiency and reducing pumping losses. During idle and steady state cruising operation, EGR is increased, and engine throttle position is controlled to regulate the estimated engine output torque in accordance with the driver requested output torque. During transient torque increases, throttle control alone is used to regulate the output torque, while in transient torque decreases, the throttle position is maintained and spark timing is used to regulate the output torque.

8 Claims, 8 Drawing Sheets

FIG. 6

ENGINE TORQUE MANAGEMENT METHOD WITH HIGH DILUTION EGR CONTROL

TECHNICAL FIELD

This invention relates to a torque management control for an internal combustion engine, and more particularly to a control that achieves high dilution by maximizing exhaust gas recirculation (EGR).

BACKGROUND OF THE INVENTION

Recirculation of a controlled amount of exhaust gas into the intake air stream of a vehicle engine, via EGR valve control and/or valve overlap control, has been effectively utilized for reducing exhaust gas emissions. Specifically, the recirculated exhaust gas tends to reduce the peak combustion temperature and pressure, which in turn, reduces nitrogen oxide components (NOx) in the exhaust. Some fuel economy improvements are also achieved since EGR tends to raise the intake manifold pressure, thereby reducing the engine pumping losses. However, the usage of EGR has been limited in production vehicles since the exhaust gas displaces oxygen in the air/fuel mixture, which can cause degraded engine performance. For this reason, the fuel economy improvement realized due to EGR has been relatively minor.

SUMMARY OF THE INVENTION

The present invention is directed to an improved engine torque management control that coordinates engine throttle, spark and EGR under predefined highly throttled conditions so as to maximize the fuel economy improvement of EGR without degrading engine performance. Under the predefined conditions, EGR is increased to a level that maximizes the fuel economy improvement without causing combustion instability, and the throttle position and spark timing are controlled to compensate for the anticipated torque loss while increasing volumetric efficiency and reducing pumping losses. During idle and steady state cruising operation, EGR is increased, and engine throttle position is controlled to regulate the estimated engine output torque in accordance with the driver requested output torque. During transient torque increases, throttle control alone is used to regulate the output torque, while in transient torque decreases, the throttle position is maintained and spark timing is used to regulate the output torque.

BRIEF DESCRIPTION OF THE DRAWINGS

FIGS. 4–6 graphically illustrate the control of this invention as carried out by the controller of FIGS. 1–3.

DESCRIPTION OF THE PREFERRED EMBODIMENT

Figure 1:
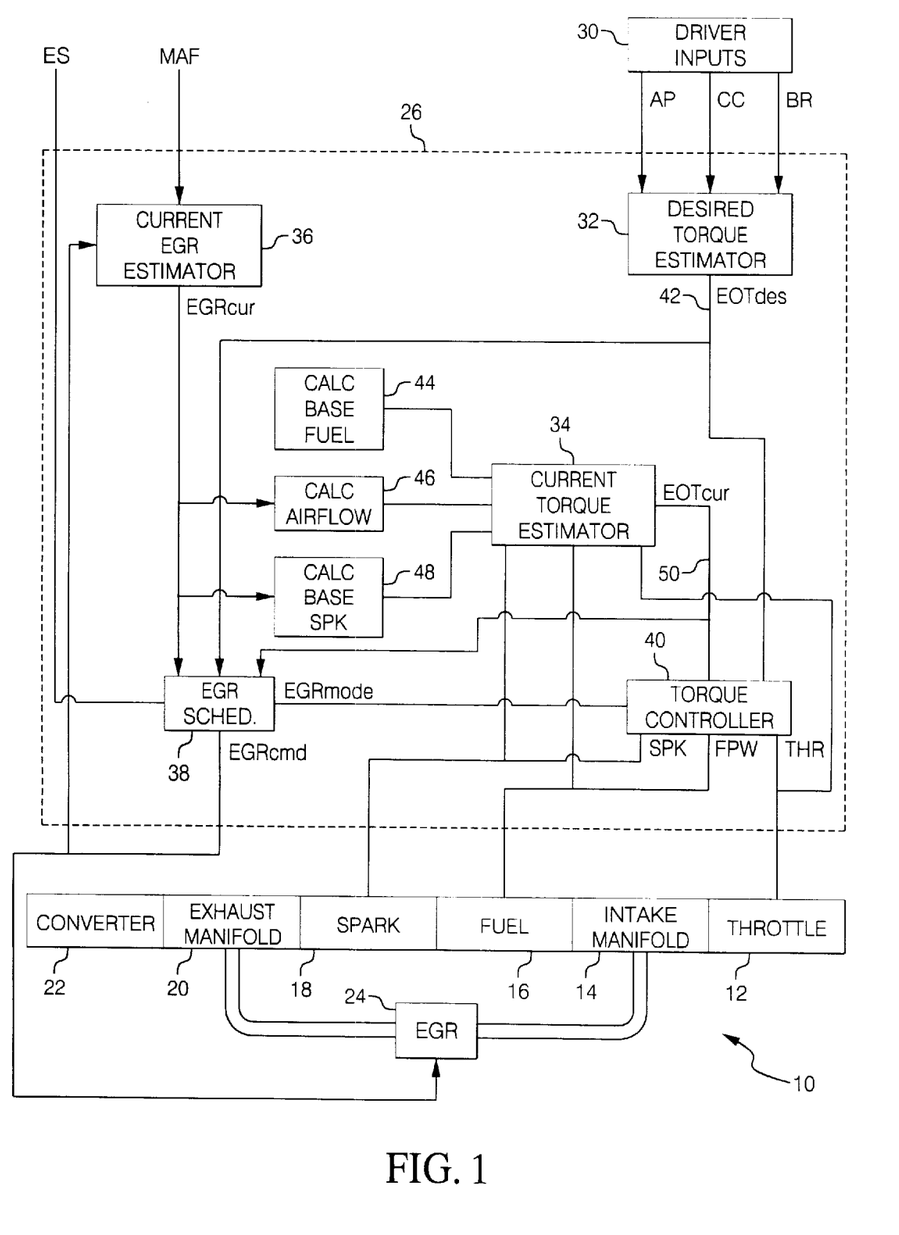
FIG. 1 is a block diagram of a motor vehicle engine and controller according to this invention.

Referring to FIG. 1, the reference numeral 10 generally designates a motor vehicle internal combustion engine controlled according to this invention. For the purpose of illustration, the engine 10 is depicted as comprising an electronic throttle 12, an intake manifold 14, an electronic fuel delivery system 16, an electronic spark controller 18, an exhaust manifold 20, and a three-way catalytic converter 22. The electronic throttle 12 positions a throttle valve in accordance with the throttle command THR, the electronic fuel delivery system 16 injects a fuel quantity based on the fuel pulse width FPW, and the electronic spark controller 18 controls the spark timing based on the spark command SPK. An exhaust gas recirculation valve (EGR) 24 couples the exhaust manifold 20 to the intake manifold 14, and is activated to recycle a controlled amount of exhaust gas in engine 10. The above-described systems and components will be well known to those skilled in the art, and further detail is omitted herein for the sake of brevity.

The reference numeral 26 generally designates a microprocessor-based engine control module (ECM) for regulating the operation of engine 10 in response to engine and ambient sensor information, and driver inputs. The engine and ambient sensor information includes numerous signals representing various engine and ambient parameters, such as intake manifold absolute pressure (MAP), engine speed (ES), manifold air flow (MAF), and so on. The driver inputs, represented by block 30, include signals representing accelerator pedal position (AP), cruise control switch states (CC), and brake pedal switch state (BR). In response to these inputs, the ECM 26 develops the throttle, fuel and spark signals THR, FPW, SPK, and an EGR command (EGRcmd) for controlling EGR valve 16.

The ECM 26 is illustrated as comprising a number of functional blocks, including a Desired Torque Estimator 32, a Current Torque Estimator 34, a Current EGR Estimator 36, an EGR Scheduler 38, and a Torque Controller 40. The driver inputs are applied to the Desired Torque Estimator 32, which develops an output on line 42 representing the desired net engine output torque EOTdes. The Current Torque Estimator 34 is responsive to the base fuel, airflow and spark parameters, as represented by the blocks 44, 46 and 48, and the engine control values THR, FPW and SPK, and develops a corresponding estimate of the current engine output torque EOTcur on line 50. The Current EGR Estimator 36 is responsive to the EGR command EGRcmd and the measured or computed mass air flow MAF, and develops an estimate EGRcur of the current percentage of exhaust gas in the intake air stream. The EGR Scheduler 38 is responsive to EOTdes, EOTcur, ES and EGRcur, and as explained below in reference to the flow diagram of FIGS. 2A–2C, determines the EGR mode (EGRmode) and EGR command (EGRcmd). The command EGRcmd is applied to EGR valve 24 as described above, while the mode EGRmode is applied, along with the desired and current engine torque values EOTdes, EOTcur, to the Torque Controller 40. As explained below in reference to the flow diagram of FIG. 3, the Torque Controller 40 develops the engine control values THR, FPW, SPK in a manner to bring EOTcur into correspondence with EOTdes, using the a torque control method determined according to the status of EGRmode.

Figure 2A:
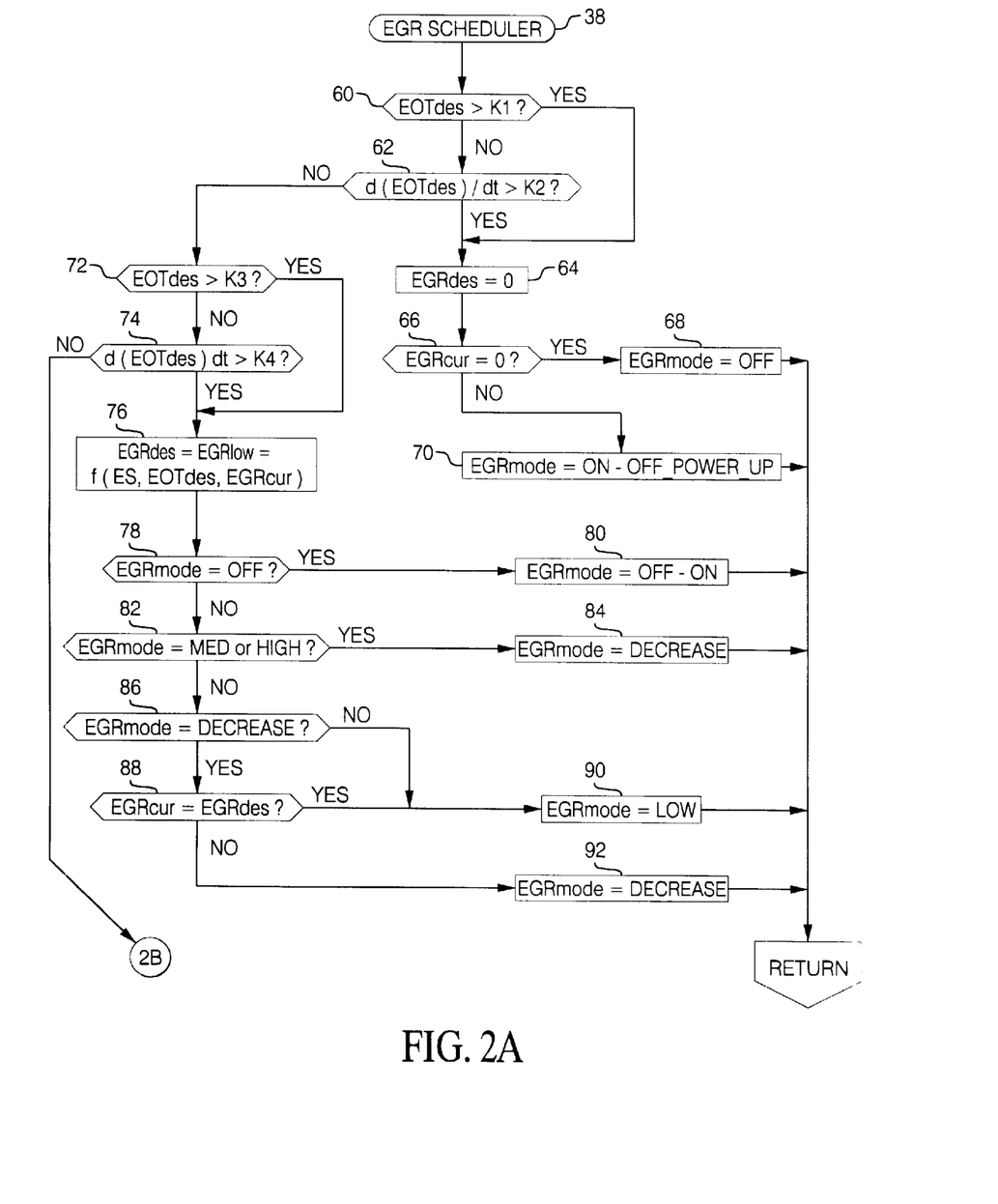
FIGS. 2A, 2B and 2C depict a flow diagram representing the functionality of the EGR Scheduler block of FIG. 1.
Figure 2B:
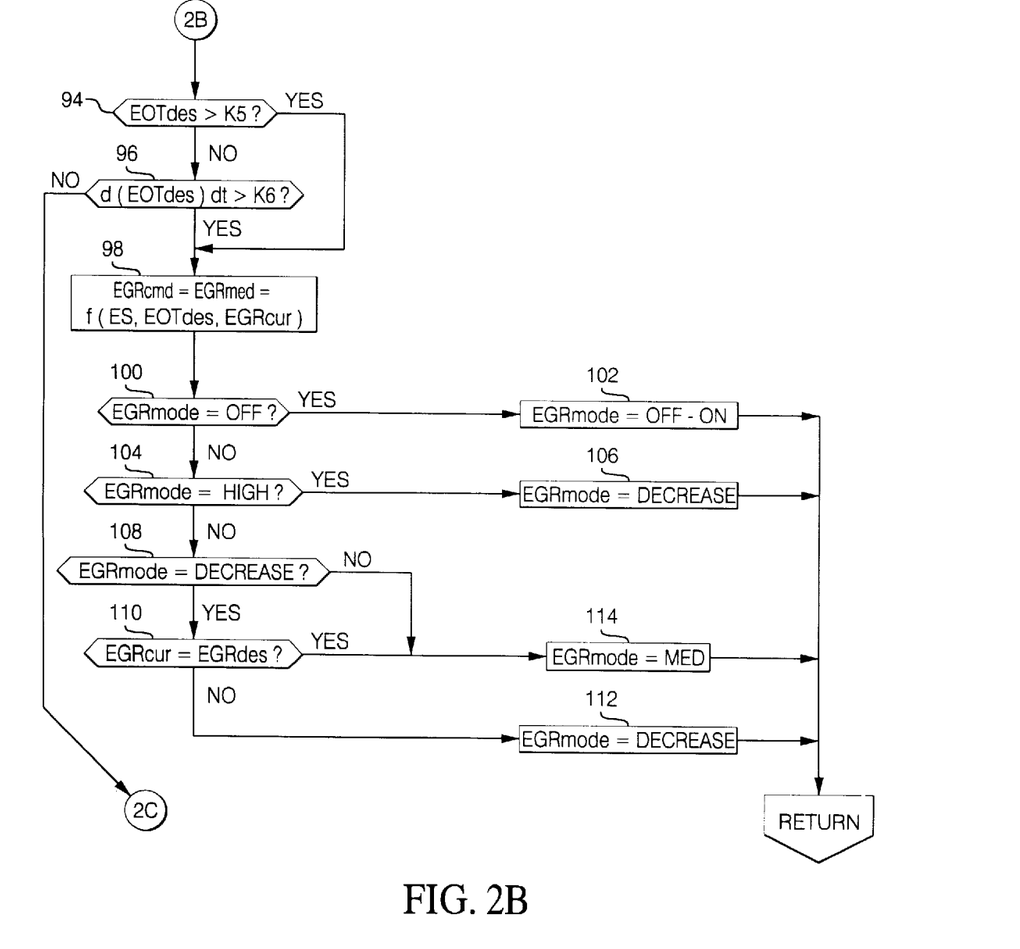
Figure 2C:
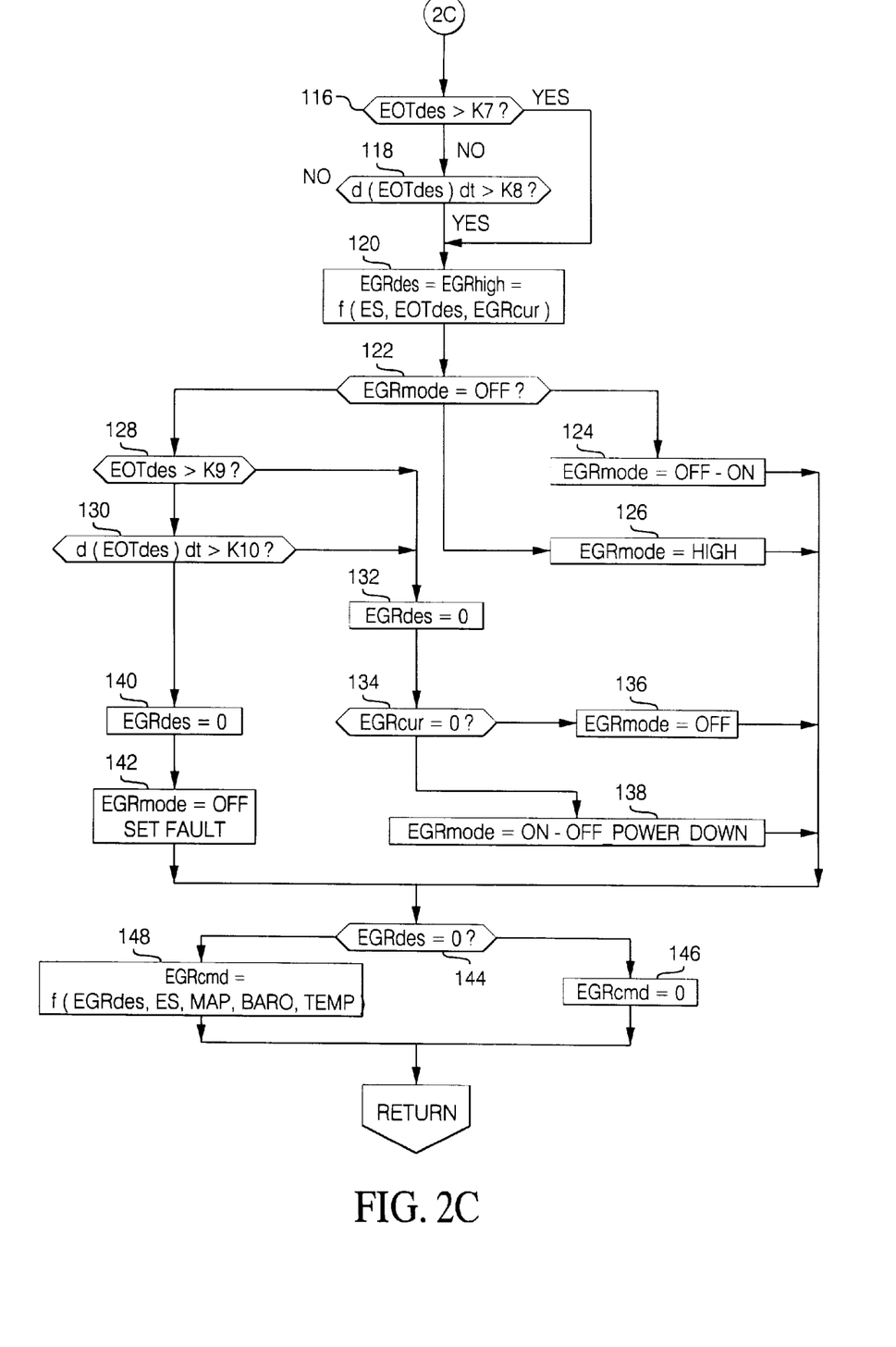

FIGS. 2A, 2B and 2C together form a flow diagram representing the functionality of the EGR Scheduler 38 of FIG. 1. Essentially, the EGR Scheduler 38 selects a desired relative EGR flow level (EGRdes) based on EOTdes and the rate of change of EOTdes (that is, d(EOTdes)/dt), sets EGRmode based on EGRdes and current EGR control parameters, and develops an EGR command (EGRcmd) based on EGRdes for the current ES, MAP operating point of engine 10. If EOTdes or d(EOTdes)/dt are within specified EGR control thresholds, EGRdes is set to a relative flow level (EGRlow, EGRmed or EGRhigh), and EGRmode indicates whether the EGR control (and hence, driver torque demand) is steady-state (LOW, MED or HIGH) or transient (DECREASE or OFF-ON). If EOTdes and d(EOTdes)/dt are outside the specified EGR control thresholds, EGRdes and EGRcmd are set equal to zero, and EGRmode indicates whether the EGR control is steady-state (OFF) or transient (ON-OFF_POWER_UP or ON-OFF_POWER_DOWN).

Referring to FIG. 2A, the EGR Scheduler initially compares EOTdes and d(EOTdes)/dt to respective upper EGR control thresholds identified in blocks 60 and 62 as K1 and K2. If EOTdes exceeds K1 or d(EOTdes)/dt exceeds K2, the block 64 sets an EGR variable EGRdes equal to zero, indicating that the driver torque demand is too high for EGR scheduling. The threshold K1 may be a predetermined torque level (i.e., a given percentage of the available torque at the current engine speed ES), and the threshold K2 may be a torque rate scheduled as a function of parameters including engine speed ES, the current torque EOTcur, and the current EGR level EGRcur. After EGRdes is set equal to zero, the blocks 66, 68, 70 determine the appropriate status of EGRmode based on EGRcur. If EGRcur is also equal to zero, EGRmode is set to OFF; if EGRcur is not equal to zero, EGRmode is set to ON-OFF_POWER_UP, indicating a high power on-to-off EGR transition.

If the conditions defined by blocks 60 and 62 are not met (that is, the driver torque demand is not too high for EGR scheduling), the blocks 72 and 74 compare EOTdes and d(EOTdes)/dt to respective thresholds K3 and K4. The threshold K3 may be a torque level, scheduled as a function of engine speed ES, above which at least a low level of EGR should be scheduled, and the threshold K4 may be a corresponding torque rate scheduled as a function of parameters including engine speed ES, the current torque EOTcur, and the current EGR percent EGRcur. If EOTdes exceeds K3 or d(EOTdes)/dt exceeds K4, the block 76 sets EGRdes to a relatively low level designated as EGRlow. As indicated at block 76, EGRlow may be scheduled as a function of engine speed ES, the desired engine torque EOTdes, and the current EGR level EGRcur. After EGRdes is set to EGRlow, the blocks 78–92 determine the appropriate status of EGRmode. If the current state of EGRmode is OFF, then EGRmode is set to OFF-ON, indicating an off-to-on EGR transition. If the current state of EGRmode is MED or HIGH, then EGRmode is set to DECREASE, indicating a scheduled reduction in the commanded amount of EGR. If the current state of EGRmode is DECREASE, and EGRcur is not equal to EGRdes, then the DECREASE status of EGRmode is retained. Otherwise, EGRmode is set to LOW, corresponding with the new setting of EGRdes.

If the conditions defined by blocks 60, 62 and 72, 74 are not met (that is, EOTdes≦K3 and d(EOTdes)/dt≦K4), the flow diagram portion shown in FIG. 2B is executed to determine if a medium (MED) level of EGR is appropriate. Specifically, the blocks 94 and 96 compare EOTdes and d(EOTdes)/dt to respective thresholds K5 and K6. The threshold K5 may be a torque level, scheduled as a function of engine speed ES, above which at least a medium level of EGR should be scheduled, and the threshold K6 may be a corresponding torque rate scheduled as a function of parameters including engine speed ES, the current torque EOTcur, and the current EGR percent EGRcur. If EOTdes exceeds K5 or d(EOTdes)/dt exceeds K6, the block 98 sets EGRdes to a medium level designated as EGRmed. As indicated at block 98, EGRmed may be scheduled as a function of engine speed ES, the desired engine torque EOTdes, and the current EGR level EGRcur. After EGRdes is set to EGRmed, the blocks 100–114 determine the appropriate status of EGRmode. If the current state of EGRmode is OFF, then EGRmode is set to OFF-ON, indicating an off-to-on EGR transition. If the current state of EGRmode is HIGH, then EGRmode is set to DECREASE, indicating a scheduled reduction in the commanded amount of EGR. If the current state of EGRmode is DECREASE, and EGRcur is not equal to EGRdes, then the DECREASE status of EGRmode is retained. Otherwise, EGRmode is set to MED, corresponding with the new setting of EGRdes.

If the conditions defined by blocks 60, 62 and 72, 74 and 94, 96 are not met (that is, EOTdes≦K5 and d(EOTdes)/dt≦K6), the flow diagram portion shown in FIG. 2C is executed to determine if a high level of EGR is appropriate. Specifically, the blocks 116 and 118 compare EOTdes and d(EOTdes)/dt to respective thresholds K7 and K8. The threshold K7 may be a torque level, scheduled as a function of engine speed ES, above which at least a high level of EGR should be scheduled, and the threshold K8 may be a corresponding torque rate scheduled as a function of parameters including engine speed ES, the current torque EOTcur, and the current EGR percent EGRcur. If EOTdes exceeds K5 or d(EOTdes)/dt exceeds K6, the block 120 sets EGRdes to a high level designated as EGRhigh. As indicated at block 120, EGRhigh may be scheduled as a function of engine speed ES, the desired engine torque EOTdes, and the current EGR level EGRcur. After EGRdes is set to EGRhigh, the blocks 122–126 determine the appropriate status of EGRmode. If the current state of EGRmode is OFF, then EGRmode is set to OFF-ON, indicating an off-to-on EGR transition. Otherwise, EGRmode is set to HIGH, corresponding with the new setting of EGRdes.

If the conditions defined by blocks 116 and 118 are not met, the blocks 128 and 130 compare EOTdes and d(EOTdes)/dt to respective thresholds K9 and K10. The threshold K9 may be a low torque level, scheduled as a function of engine speed ES, below which no EGR should be scheduled, and the threshold K10 may be a corresponding low torque rate scheduled as a function of parameters including engine speed ES, the current torque EOTcur, and the current EGR percent EGRcur. If EOTdes exceeds K9 or d(EOTdes)/dt exceeds K10, the block 132 sets EGRdes to a zero, and the blocks 134–138 determine the appropriate status of EGRmode. If EGRcur is also equal to zero, EGRmode is set to OFF; if EGRcur is not equal to zero, EGRmode is set to ON-OFF_POWER_DOWN, indicating a low power on-to-off EGR transition. If blocks 128 and 130 are answered in the negative, a system fault is assumed, and the blocks 140 and 142 are executed to set EGRdes to zero, to set EGRmode to OFF, and to set a FAULT indicator.

Finally, the blocks 144, 146, 148 are executed to set the value of the output EGRcmd based on EGRdes and other system variables. If EGRdes is zero, which occurs during conditions of very high or very low EOTdes or d(EOTdes)/dt, the block 146 sets EGRcmd equal to zero. Otherwise, the block 148 sets EGRcmd to a relative value defined by EGRdes (LOW, MED, HIGH, OFF-ON, or DECREASE), based on the engine load point in terms of ES and MAP, compensated for barometric pressure BARO and engine temperature TEMP.

Figure 3:
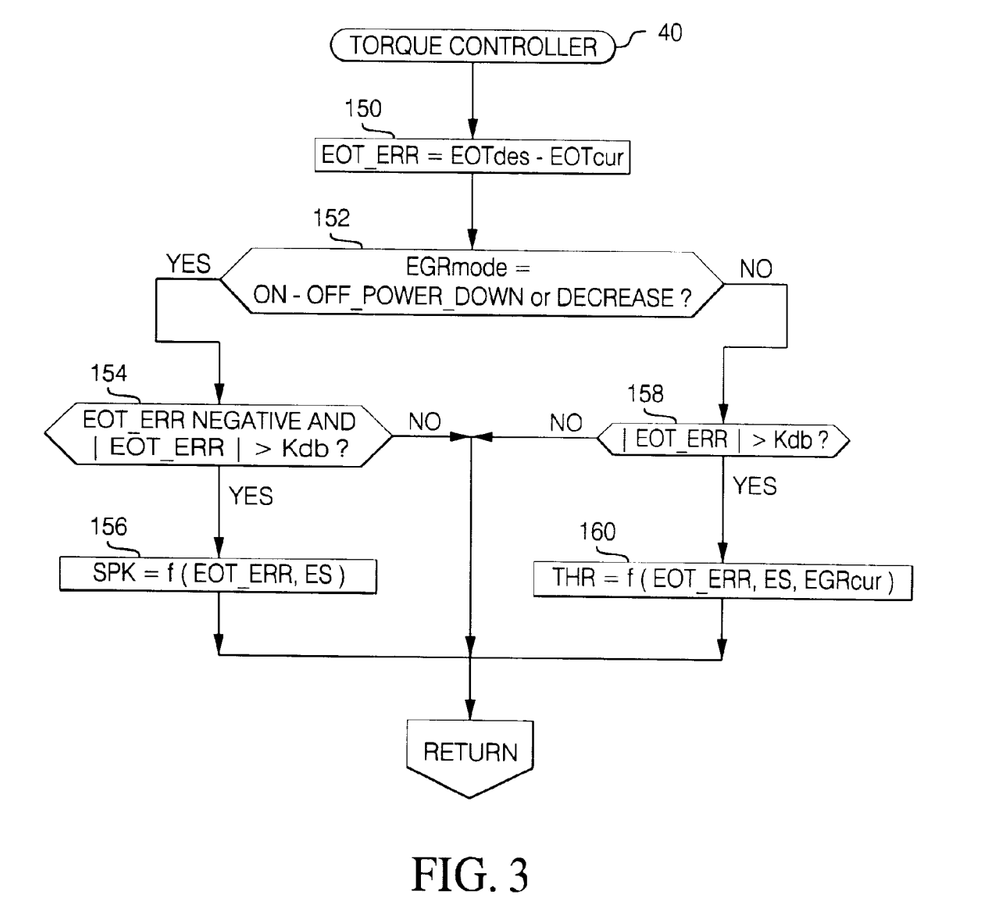
FIG. 3 depicts a flow diagram representing the functionality of the Torque Controller block of FIG. 1.

FIG. 3 is a flow diagram representing the functionality of the Torque Controller 40 of FIG. 1. Essentially, the Torque Controller 40 selects either first or second torque control methodologies based on the status of EGRmode. Since both methodologies are closed-loop in nature, the block 150 is first executed to compute the engine torque error EOT_ERR according to the difference (EOTdes−EOTcur). Then block 152 checks the status of EGRmode. If EGRmode is ON-OFF_POWER_DOWN or DECREASE, a transient negative (that is, decreasing) EGR control is indicated; in this case, the blocks 154, 156 are executed to initiate an engine torque control in which the engine throttle is maintained at a current setting, and the engine spark advance command SPK is adjusted as required to eliminate the torque error EOT_ERR. As indicated, SPK is adjusted (retarded) based on EOT_ERR and ES if EOT_ERR is negative (EOTdes less than EOTcur) and |EOTdes| is greater than a dead band threshold Kdb. No action is taken if |EOT_ERR| is within Kdb. On the other hand, block 152 is answered in the negative if the status of EGRmode is OFF, LO, MEDIUM, HIGH, ON-OFF_POWER_UP or OFF-ON; these conditions occur when the EGR control is either steady-state (OFF, LO, MEDIUM, HIGH) or transient negative (OFF-ON). Under these conditions, the blocks 158, 160 are executed to initiate an engine torque control in which the engine throttle command THR is adjusted as required to eliminate the torque error EOT_ERR, so long as |EOT_ERR| is greater than Kdb. In such case, the throttle command THR is adjusted based on EOT_ERR, ES and EGRcur.

Figure 4:
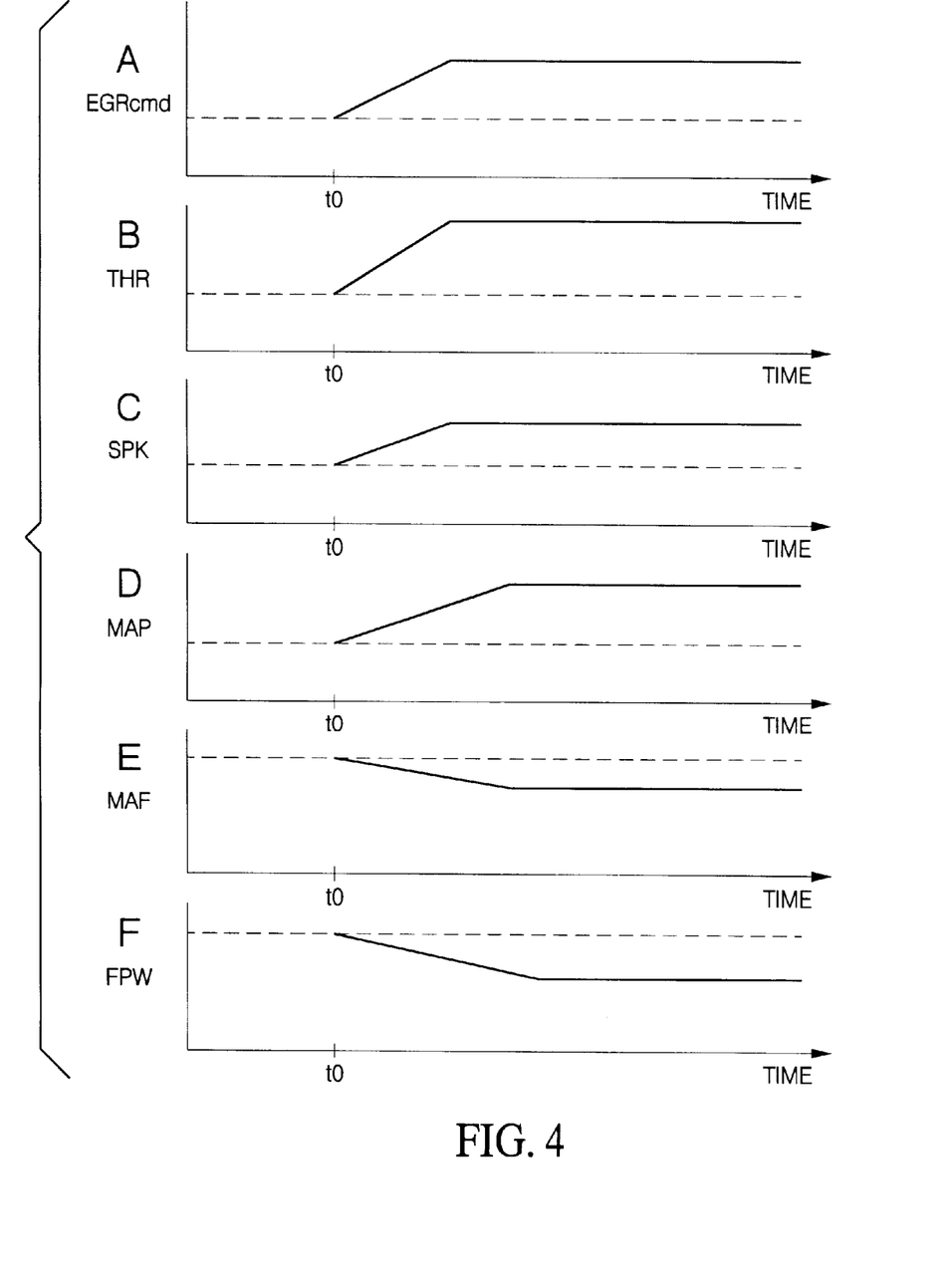
FIG. 4 depicts a steady state highly throttled condition.
Figure 5:
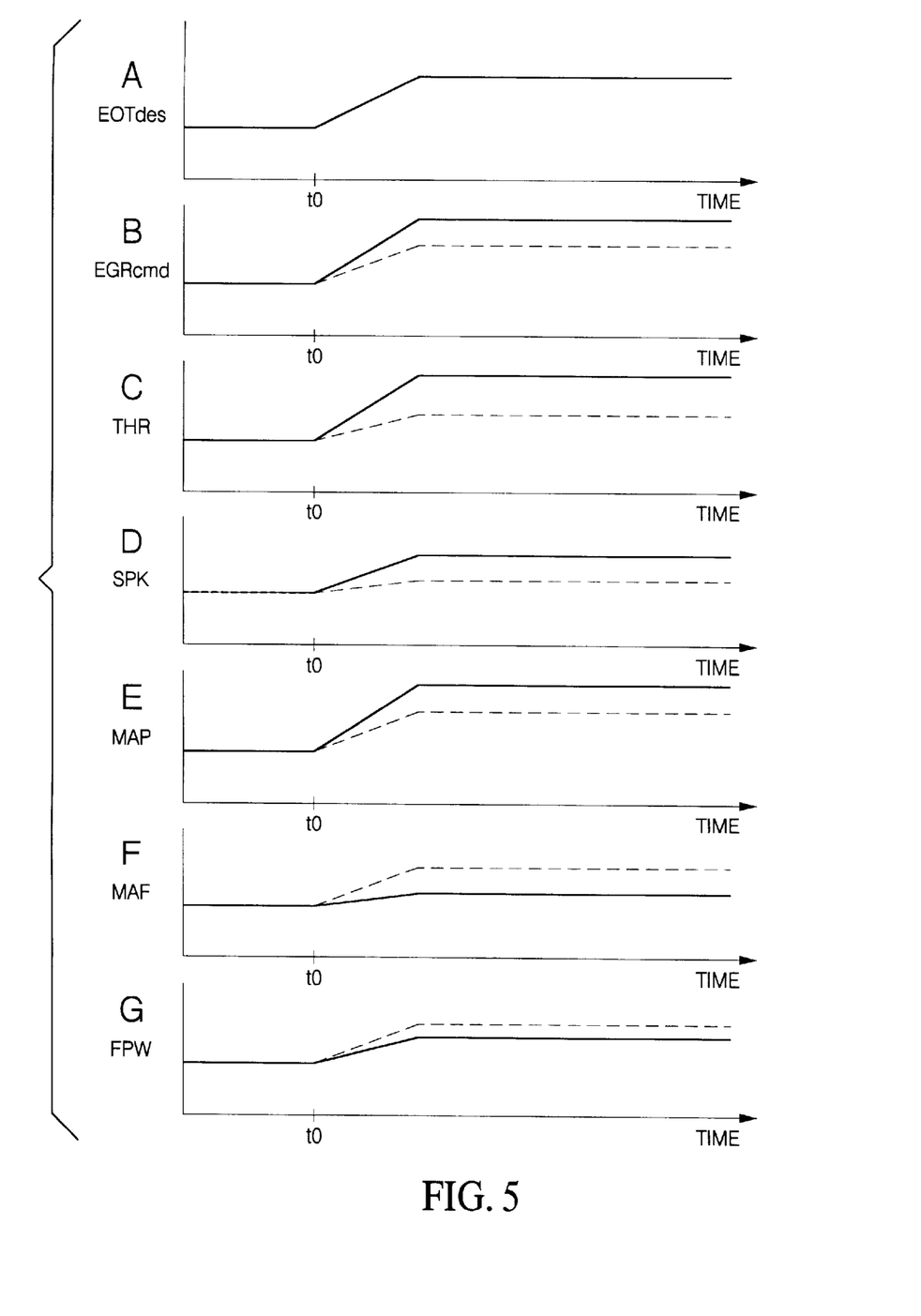
FIG. 5 depicts a transient power up condition.
Figure 6:
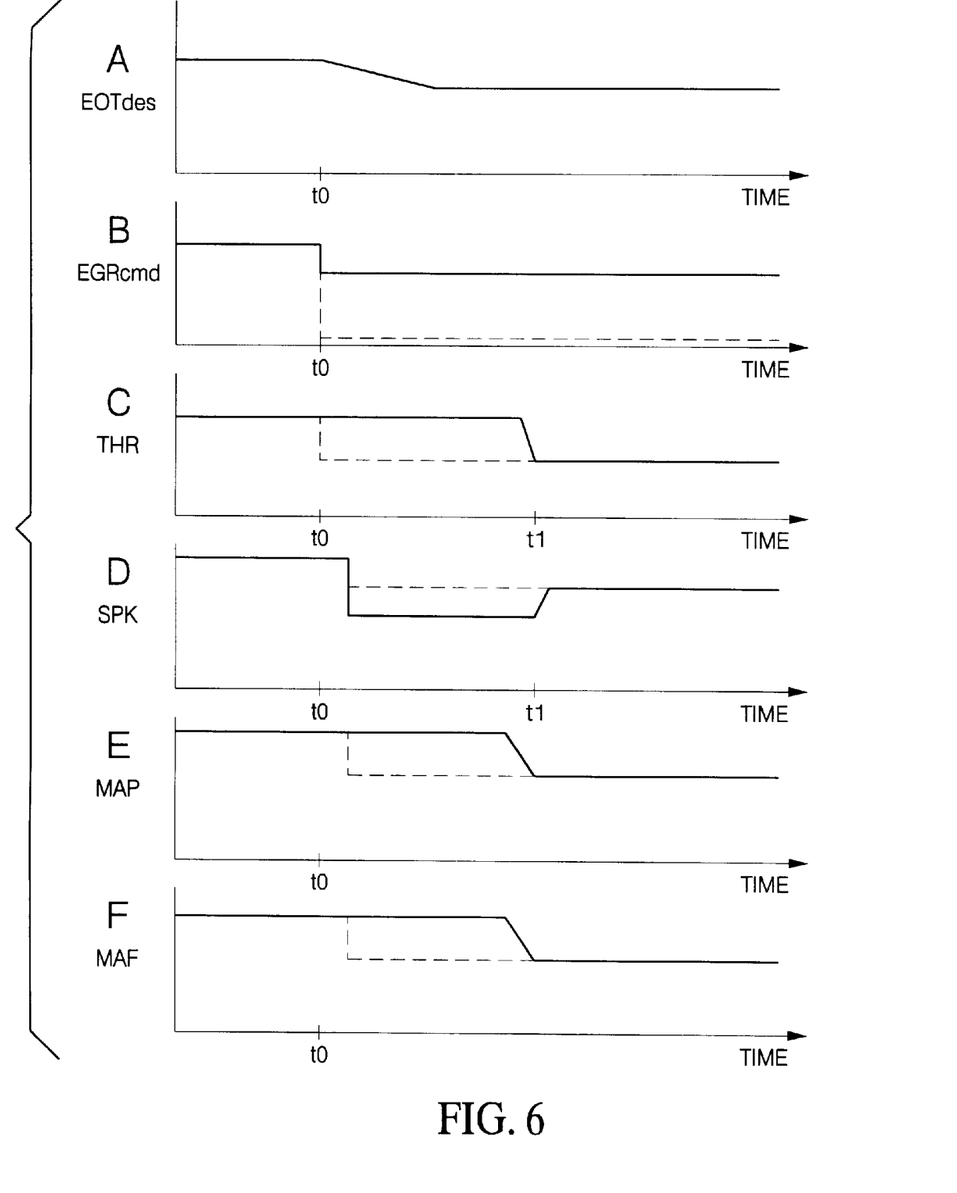
FIG. 6 depicts a transient power down condition.

The above-described control is graphically represented for a variety of different operating conditions in FIGS. 4–6. FIG. 4 depicts a steady state highly throttled condition; FIG. 5 depicts a transient power up condition; and FIG. 6 depicts a transient power down condition.

Referring to FIG. 4, Graphs A–E respectively depict the EGR command EGRcmd, the throttle command THR, the spark timing command SPK, the engine intake manifold pressure MAP, the intake manifold air flow MAF, and the fuel pulse command FPW for a steady state highly throttled condition such as cruising or idle. In each Graph of FIG. 4, the broken trace represents a conventional control, whereas the solid trace represents the control of this invention, as initiated at time t0. Although not shown in FIG. 4, the engine speed ES and engine output torque remain constant in spite of the illustrated control. Referring to Graphs A and B, it will be seen that the control of this invention significantly increases EGR flow compared to the conventional approach, and maintains the driver requested output torque EOTdes by increasing the throttle command THR. The increased throttle command THR causes advancing of the base spark timing (Graph C), and increases the intake manifold pressure MAP (Graph D) for improved volumetric efficiency. The increased EGR command EGRcmd decreases the intake manifold air flow MAF (Graph E), which produces a corresponding reduction in the fuel command FPW (Graph F). In an idle condition, the spark timing may be modulated for engine speed control.

Referring to FIG. 5, Graphs A–G respectively depict the desired engine output torque EOTdes, the EGR command EGRcmd, the throttle command THR, the spark timing command SPK, the engine intake manifold pressure MAP, the intake manifold air flow MAF, and the fuel pulse command FPW for a transient EGR power up condition. In this case, the control of this invention responds to an increased torque demand (Graph A) initiated at time t0; the broken traces represent a conventional control response, whereas the solid traces represent the control response of this invention. For purposes of comparison, it is assumed that the control of this invention is inactive prior to time t0. Although not shown in FIG. 5, the engine speed ES and output torque increase in correspondence with EOTdes, with or without the control of this invention. Referring to Graphs B and C, it will be seen that the control of this invention significantly increases EGR flow compared to the conventional approach, and produces the driver requested output torque EOTdes by increasing the throttle command THR. As with the steady-state example of FIG. 4, the increased throttle command THR causes advancing of the base spark timing (Graph D), and increases the intake manifold pressure MAP (Graph E) for improved volumetric efficiency. Also, the increased EGR command EGRcmd decreases the intake manifold air flow MAF (Graph F), which lessens the increase in the fuel command FPW (Graph G).

Referring to FIG. 6, Graphs A–F respectively depict the desired engine output torque EOTdes, the EGR command EGRcmd, the throttle command THR, the spark timing command SPK, the engine intake manifold pressure MAP, and the intake manifold air flow MAF for a transient EGR power down condition. The control of this invention responds to an decreased torque demand (Graph A) initiated at time t0; the broken traces represent a conventional control response, whereas the solid traces represent the control response of this invention. For purposes of comparison, it is assumed that the control of this invention is inactive prior to time t0. Although not shown in FIG. 6, the engine speed ES, fuel command FPW and output torque decrease in correspondence with EOTdes, with or without the control of this invention. Referring to Graphs B, C and D, it will be seen that the control of this invention significantly increases EGR flow compared to the conventional approach, maintains the pre-transient throttle setting THR for a transient interval t0–t1, and produces the driver requested output torque EOTdes by retarding (decreasing) the spark timing command SPK. Maintaining the pre-transient throttle command THR maintains the intake manifold pressure MAP (Graph E) and manifold air flow MAF (Graph F), purging the manifold 14 of excess fuel and exhaust gas in the transient interval t0–t1, while the retarded spark timing (Graph D) causes the engine output torque to decrease in correspondence with EOTdes. At the conclusion of the transient interval t0–t1, the spark timing command SPK is returned to the normal level (Graph D), and the throttle command THR is controlled so conform the current output torque EOTcur to the desired output torque EOTdes, as described above in respect to FIG. 4.

In summary, the control of this invention enables the use of increased EGR for improved fuel efficiency and emission control, without compromising vehicle driveability, combustion stability or transient emissions. While described in reference to the illustrated embodiment, it is expected that various modifications in addition to those mentioned above will occur to those skilled in the art. Thus, it will be understood that control methodologies incorporating such modifications may fall within the scope of this invention, which is defined by the appended claims.

What is claimed is:

1. A method of operation for a spark ignition internal combustion engine having throttle, fuel and spark timing controls for regulating engine output torque in response to driver demand, and an exhaust gas recirculation (EGR) control for introducing engine exhaust gas into an intake air stream of the engine, the method comprising the steps of:

determining a desired output torque based on said driver demand;

estimating a current output torque based on said throttle, fuel and spark timing controls; and when a steady-state or positive transient driver demand operating condition of the engine is detected, overriding the EGR control to provide an increased EGR flow, and overriding the throttle control to maintain the estimated current output torque in conformance with the desired output torque.

2. The method of operation of claim 1, wherein the step of overriding the throttle control includes the step of:
developing a command for the throttle control based on a deviation of the estimated current output torque from the desired output torque.

3. The method of operation of claim 1, including the steps of:
detecting a pre-defined negative transient in driver demand; and
during a transient control interval initiated in response to the detection of said negative transient:
maintaining a throttle control command in effect at the initiation of said transient control interval; and
overriding the spark timing control to maintain the estimated current output torque in conformance with the desired output torque.

4. The method of operation of claim 3, including the steps of:
terminating said transient control interval; and
upon such termination, returning the spark timing control to a base setting, and adjusting the throttle control command to maintain the estimated current output torque in conformance with the desired output torque.

5. The method of operation of claim 3, including the steps of:
establishing torque and torque rate thresholds for each of a number of relative levels of EGR flow;
selecting a desired one of said relative levels of EGR flow based on the desired output torque and a rate of change of the desired output torque, relative to said established torque and torque rate thresholds; and
determining said increased EGR flow based on the selected desired relative level and a measured speed and load of said engine.

6. The method of operation of claim 5, including the step of:
detecting a pre-defined negative transient in driver demand if the selected desired relative level of EGR flow is lower than a previously selected level of EGR flow.

7. The method of operation of claim 1, including the steps of:
selecting a desired relative level of EGR flow based on the desired output torque and a rate of change of the desired output torque; and
determining said increased EGR flow based on said desired relative level and a measured speed and load of said engine.

8. The method of operation of claim 7, wherein the step of selecting a desired relative level of EGR flow includes the steps of:
establishing torque and torque rate conditions for each of a number of relative levels of EGR flow; and
selecting a desired one of said relative levels of EGR flow when the desired output torque or the rate of change of the desired output torque satisfies the respective torque or torque rate conditions for such one relative level of EGR flow.

* * * * *